(12) United States Patent
Rissio

(10) Patent No.: US 10,961,472 B2
(45) Date of Patent: Mar. 30, 2021

(54) MODIFICATION OF FATS AND OILS FOR FUEL AND LUBRICATING APPLICATIONS

(71) Applicant: 21ST CENTURY R & D, LLC, Dover, DE (US)

(72) Inventor: John Rissio, Brownstown, MI (US)

(73) Assignee: 21st Century R & D, LLC, Dover, DE (US)

( * ) Notice: Subject to any disclaimer, the term of this patent is extended or adjusted under 35 U.S.C. 154(b) by 0 days.

(21) Appl. No.: 15/356,870

(22) Filed: Nov. 21, 2016

(65) Prior Publication Data

US 2017/0066985 A1 Mar. 9, 2017

Related U.S. Application Data

(63) Continuation of application No. 12/672,385, filed as application No. PCT/US2008/072580 on Aug. 8, (Continued)

(51) Int. Cl.
| | |
|---|---|
| *C10M 109/02* | (2006.01) |
| *C10L 1/02* | (2006.01) |
| *C10L 10/14* | (2006.01) |
| *C10M 159/00* | (2006.01) |
| *C10L 1/19* | (2006.01) |
| *C10L 1/18* | (2006.01) |
| *C10N 30/00* | (2006.01) |

(Continued)

(52) U.S. Cl.
CPC ............. *C10L 1/026* (2013.01); *C10L 1/023* (2013.01); *C10L 10/14* (2013.01); *C10M 109/02* (2013.01);
(Continued)

(58) Field of Classification Search
CPC ............. C10M 2207/40; C10M 109/02; C10L 2200/0476
See application file for complete search history.

(56) References Cited

U.S. PATENT DOCUMENTS 2,360,844 A    10/1944    Bradshaw et al.
4,218,386 A *   8/1980    Logan ....................... C11C 1/04
                                                      554/160

(Continued)

OTHER PUBLICATIONS

K.C. Yong, T.L. Ooi, K. Dzulkefly, W.M.Z. Wan Yunus, A.H. Hazimah, Refining of crude glycerine recovered from glycerol residue by simple vacuum distillation, Journal of Oil Palm Research, 13 (2001), pp. 39-44 (Year: 2001).*

(Continued)

*Primary Examiner* — Ellen M McAvoy
*Assistant Examiner* — Ming Cheung Po
(74) *Attorney, Agent, or Firm* — Brooks Kushman P.C.

(57) ABSTRACT

A bio-organic composition includes residues of a fatty acid glyceride-containing composition, residues of a first epoxide or glycol, and the residues of a second epoxide. The fatty acid glyceride-containing composition is characterized by the viscosity at room temperature. The first epoxide or glycol and second epoxides are present in a sufficient amount that the room temperature viscosity of the bio-organic composition is lower than the room temperature viscosity of the vegetable oil prior to formulation and/or the first epoxide or glycol and second epoxides are present in a sufficient amount that the pour point of the bio-organic composition is lower than the pour point of the fatty acid glyceride-containing composition prior to formulation.

17 Claims, 1 Drawing Sheet

Related U.S. Application Data 2008, now abandoned, which is a continuation-in-part of application No. 11/836,477, filed on Aug. 9, 2007, now abandoned.

(51) Int. Cl.
*C10N 40/25* (2006.01)
*C10N 70/00* (2006.01)

(52) U.S. Cl.
CPC ......... C10M 159/00 (2013.01); *C10L 1/1817* (2013.01); *C10L 1/191* (2013.01); *C10L 2200/0423* (2013.01); *C10L 2200/0446* (2013.01); *C10L 2200/0469* (2013.01); *C10L 2200/0476* (2013.01); *C10L 2270/023* (2013.01); *C10L 2270/026* (2013.01); *C10M 2207/24* (2013.01); *C10M 2207/40* (2013.01); *C10N 2030/64* (2020.05); *C10N 2040/25* (2013.01); *C10N 2070/00* (2013.01); *Y02E 50/10* (2013.01)

(56) References Cited

U.S. PATENT DOCUMENTS

| | | |
|---|---|---|
| 4,303,590 A | 12/1981 | Tanaka et al. |
| 4,364,743 A * | 12/1982 | Erner ..................... C10L 1/02 44/388 |
| 4,608,202 A | 8/1986 | Lepper et al. |
| 4,695,411 A | 9/1987 | Stern et al. |
| 5,399,731 A | 3/1995 | Wimmer |
| 5,434,279 A | 7/1995 | Wimmer |
| 6,051,539 A | 4/2000 | Kodali et al. |
| 6,291,409 B1 | 9/2001 | Kodali et al. |
| 6,310,233 B1 * | 10/2001 | Maurer ................... C07C 67/26 560/180 |
| 6,554,876 B1 | 4/2003 | Tack et al. |
| 6,712,954 B1 | 3/2004 | Poehler et al. |
| 6,946,008 B2 | 9/2005 | Wenzel |
| 7,112,229 B2 | 9/2006 | Khalil et al. |
| 2003/0032826 A1 | 2/2003 | Hanna |
| 2005/0155282 A1 | 7/2005 | Siggelkow et al. |
| 2005/0257420 A1 | 11/2005 | Wenzel |

OTHER PUBLICATIONS

International Search Report from corresponding PCT/US08/72580, dated Oct. 22, 2008, 1 pg.

Non-Final Office Action dated Jul. 12, 2010 in corresponding U.S. Appl. No. 11/836,477, filed Aug. 9, 2007, 10 pgs.

Non-Final Office Action dated Mar. 30, 2011 in corresponding U.S. Appl. No. 11/836,477, filed Aug. 9, 2007, 8 pgs.

* cited by examiner

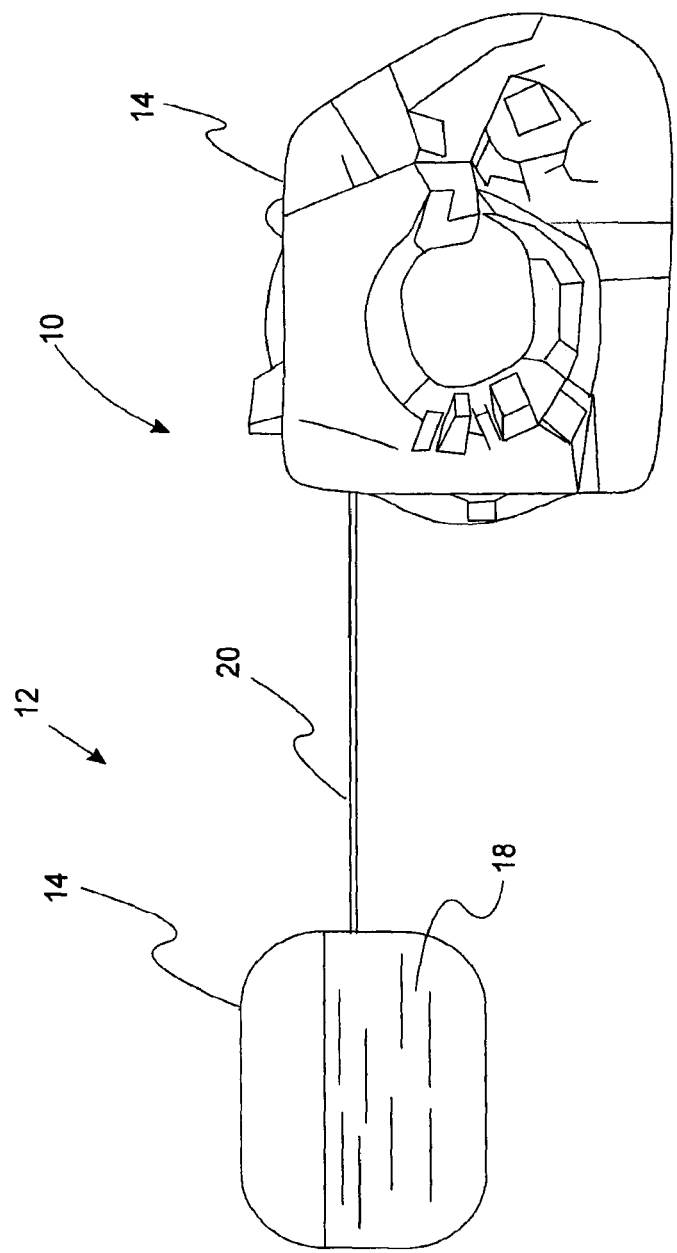

MODIFICATION OF FATS AND OILS FOR FUEL AND LUBRICATING APPLICATIONS

CROSS-REFERENCE TO RELATED APPLICATIONS

This application is a continuation of U.S. Ser. No. 12/672,385 filed Mar. 1, 2011 which is the U.S. national phase of PCT Appln. No. PCT/US2008/072580 filed Aug. 8, 2008 which is a continuation-in-part of U.S. Ser. No. 11/836,477 filed Aug. 9, 2007, the disclosures of which are incorporated in their entirety by reference herein.

BACKGROUND OF THE INVENTION

1. Field of the Invention

In at least one aspect, the present invention is related to bio-diesel fuels derived from a fatty acid glyceride-containing composition and to systems utilizing such bio-diesel fuels.

2. Background Art

Although industrial advancement has been based on fossil fuel use, political and environmental concerns provide an impetus for the development of renewable energy sources. Fossil fuel use causes significant environmental concerns due to the release of such byproducts as carbon dioxide, nitrogen oxides, sulfur dioxide, organic compounds, and the like. Carbon dioxide is a greenhouse gas and is implicated as a causative agent in global warming. Notwithstanding the environmental issues, it is inevitable that the supply of fossil fuels will eventually be depleted because of the finite nature of these fuels. For example, by some estimates the supply of oil will last only about another 50 years.

Renewable energy sources hold the promises of supplying energy for an unlimited time period. Solar energy is one source of renewable energy that will undoubtedly last for the lifetime of the Earth. Biodiesel fuels are a type of diesel fuel derived from biological sources that may be used in various combustion devices. Typically, biodiesel fuels are derived from vegetable oils. Some types of biodiesel fuels are formulated to be used in diesel engines without engine modification. This is in contrast to straight vegetable oils ("SVO") and waste vegetable oils ("WVO") which typically require modification of such engines. In an early biodiesel application, vegetable oil is transesterified with an alcohol such as ethanol or methanol. Biodiesel fuel provide a number of additional advantages over fossil fuels. Biodiesel fuels are usually biodegradable while producing significantly less carbon dioxide than fossil fuels. Blends of biodiesel fuels with other diesel fuels are sometimes utilized. For example, "B20" is 20% biodiesel and 80% petroleum diesel.

Accordingly, for at least these reasons, there is a need for new methods for forming renewable energy sources and for systems utilizing such energy sources.

SUMMARY OF THE INVENTION

The present invention solves one or more problems of the prior art by providing in at least one aspect a method of forming bio-organic compositions that are useful for bio-diesel fuel, fuel blend, and motor oil applications. The method of the present embodiment includes a step in which a fatty acid glyceride-containing composition, a first epoxide or glycol, and a reaction promoter are reacted in a first step. In a subsequent step, the reaction mixture is further reacted with a second epoxide.

In another embodiment, the bio-organic composition formed by the methods of the invention is provided. The bio-organic composition of this embodiment includes residues of a fatty acid glyceride-containing composition. The fatty acid glyceride-containing composition is characterized by the viscosity at room temperature and a pour point. The bio-organic composition further includes residues of a first epoxide and/or a glycol and residues of a second epoxide. The first epoxide is the same or different than the second epoxide. The first epoxide and/or glycol and second epoxide are present in a sufficient amount that the room temperature viscosity of the bio-organic composition is lower than the room temperature viscosity of the pre-formulated fatty acid glyceride-containing composition and/or the pour point of the bio-organic composition is lower than the pre-formulated fatty acid glyceride-containing composition.

BRIEF DESCRIPTION OF THE DRAWINGS

FIG. 1 is a schematic illustration of an internal combustion engine system using an embodiment of the present invention as a fuel.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. The description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a", "an", and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application in their entirety to more fully describe the state of the art to which this invention pertains.

The term "fatty acid glyceride-containing composition" as used herein means a composition that includes a component selected from the group consisting of naturally occurring vegetable and animal fats and oils, partly or fully synthetic fatty acid glycerides, used fatty acid glycerides, and combinations thereof. In general, a fatty acid glyceride-containing composition includes fats and/or oils derived from living matter.

The term "vegetable oil" as used herein means the substances derived from plants consisting of triglycerides that are normally liquid at room temperature (i.e. 25° C.).

The term "glyceride" or "fatty acid glyceride" as used herein is a compound in which glycerol is esterified with at least one fatty acid.

The term "triglyceride" or "fatty acid triglyceride" as used herein is a compound in which glycerol is esterified with three fatty acids.

The term "diesel fuel" as used herein means a fuel that is usable in a diesel engine. Diesel fuels usually include saturated hydrocarbons and aromatic hydrocarbons. A typical diesel fuel usually includes components having a chemical formula from about $C_{10}H_{22}$ to $C_{15}H_{32}$.

The term "gasoline" as used herein means a petroleum-derived mixture that includes hydrocarbons and is used to fuel an internal combustion vehicle.

A "residue of a fatty acid glyceride-containing composition" as used herein means a chemical moiety integrated in a product compound that is derived from a fatty acid glyceride-containing composition. In one refinement, the residue of a fatty acid glyceride-containing composition is a residue of a vegetable oil. In another refinement, the residue of a fatty acid glyceride-containing composition is a residue of an animal fat.

A "residue of a epoxide" as used herein means a chemical moiety integrated in a product compound that is derived from an epoxide.

The term "pour point" as used herein means the lowest temperature at which a liquid specimen can be poured. In a variation, the pour point is the lowest temperature at which movement of a test specimen is observed under prescribed conditions as described by D97-06. Pour point is usually specified for petroleum products. The entire disclosure of D97-06 is hereby incorporated by reference.

The term "reaction promoter" as used herein means any chemical species that facilitates a chemical reaction. Such promoter may initiate a reaction and accelerate a reaction. Reaction promoters include, but are not limited to, catalysts. In a variation of the present invention, reaction promoters are bases.

In an embodiment of the present invention, a method for forming a bio-organic composition is provided. The bio-organic composition made by the method of the invention includes residues of a fatty acid glyceride-containing composition. In one refinement, the fatty acid glyceride-containing composition includes animal fat or oil. In another refinement, the fatty acid glyceride-containing composition includes vegetable fat or oil. In a further refinement, the vegetable oil is characterized by a viscosity at room temperature and a pour point prior to formulation in the present embodiment. The bio-organic composition further include residues of a first epoxide or a glycol and residues of a second epoxide. The first epoxide when present is the same or different than the second epoxide. In a variation, the first epoxide or glycol and the second epoxides are present in a sufficient amount that the room temperature viscosity of the bio-organic composition is lower than the room temperature viscosity of the pre-formulated fatty acid glyceride-containing composition. In another variation, the first epoxide or glycol and the second epoxides are present in a sufficient amount that the pour point of the bio-organic composition is lower than the pour point of the pre-formulated fatty acid glyceride-containing composition. In a refinement of the present invention, the pour point of the bio-organic compositions is less than or equal to, in increasing order of preference, 0° F., −10° F., −20° F., −30° F., −40° F., and −50° F. In another refinement, the pour point of the bio-organic compositions is greater than or equal to, in increasing order of preference, −30° F., −40° F., −50° F., −60° F., and −65° F. Generally, the pour point of the bio-organic compositions is from −50° F. to 0° F. Some compositions of the present invention are characterized by having an ignition temperature from about 180° F. to about 260° F. Other compositions of the present invention are characterized by having an ignition temperature from about 200° F. to about 250° F.

In a variation of the present embodiment, the bio-organic compositions have a free glycerol concentration less than about 5 wt %. In a further refinement, the bio-organic compositions have a free glycerol concentration less than about 2 wt %. In another refinement, the bio-organic compositions have a free glycerol concentration less than about 1 wt %. In still another refinement, the bio-organic compositions have a free glycerol concentration less than about 0.5 wt %. In yet another refinement, the bio-organic compositions have a free glycerol concentration less than about 0.1 wt %. In a particularly useful refinement of the invention, the free glycerol concentration is substantially zero. It should be readily apparent that the bio-organic compositions posses such low free glycerol concentrations because of partial reactions (e.g., hydrolysis) of the fatty acid glyceride-containing composition. Such partially reaction results in glycerol remaining esterified with one or two acid groups from the initial fatty acid glyceride-containing composition.

The method of the present invention includes a step in which fatty acid glyceride-containing composition and a reaction promoter (e.g., potassium hydroxide, sodium hydroxide, etc.) are mixed together and then reacted at a first predefined temperature and pressure to form a first intermediate composition. In one refinement, the fatty acid glyceride-containing composition includes animal fat or oil. In another refinement, the fatty acid glyceride-containing composition includes vegetable fat or oil. This reaction temperature is typically greater than room temperature and the pressure is elevated (greater than about 1.1 atm). Typically, the pressure is initially elevated (several PSI over atmospheric pressure) do to the addition of inert gas (e.g., nitrogen). The pressure will rise during reaction and then decrease towards the initial pressure as the reaction completes. The pressure rise may be from about 5 to 50 PSI. This of course will be dependent on the particular reaction being run. In a refinement of the method, the reaction temperature is from 200° F. to about 350° F. In another refinement of the invention, the reaction temperature is from about 250° F. to about 300° F. In still another refinement of the invention, the reaction temperature is from about 270° F. to about 280° F. Optionally, this reaction is performed in a pressure reactor operating at an elevated pressure (greater than about 1.1 atm). The first epoxide or glycol is then added while maintaining the temperature and pressure of the first intermediate composition to form the second intermediate composition. The amounts of fatty acid glyceride-containing composition, ethylene oxide or glycol and reaction promoter are chosen to suit a desired application. Typically, the amount of fatty acid glyceride-containing composition is from about 35 to about 85 parts by weight. All percentages and parts as used herein are weight percentages and parts by weight unless stated to the contrary. In a variation, the amount of fatty acid glyceride-containing composition is from about 45 to about 75 parts by weight. In another variation, the amount of fatty acid glyceride-containing composition is from about 50 to about 65 parts by weight. Typically, the first epoxide or glycol is present in an amount from about 2 parts by weight to about 15 parts by weight. In a variation, the amount of the first epoxide or glycol is from about 5 to about 10 parts by weight. In another variation, the amount of the first epoxide or glycol is from about 6 to about 8 parts by weight. Finally, the reaction promoter is typically present in an amount from about 0.5 parts by weight to about 10 parts by weight. In a variation, the amount of the reaction promoter is from about 5 to about 10 parts by weight. In another variation, the amount of the reaction promoter is from about 6 to about 8 parts by weight.

In a second step, the second intermediate composition is reacted with a solvent such as water or an alcohol (e.g., methanol, ethanol). An additional amount of reaction promoter is then added to form a third intermediate composition. The temperature and pressure is maintained in the ranges set forth above. A fourth intermediate composition is formed by adding the second epoxide while maintaining the temperature in the provided ranges. After the entire second epoxide is added, the fourth reaction mixture is maintained at an elevated temperature for a predetermined period of time. Typically, this predetermined period of time is about an hour. The method described thus far is useful for forming a composition utilized as a motor oil substitute.

In a variation of the method of the invention, a method for forming a composition for utilization as a bio-diesel fuel is provided. In this variation, additional epoxide, an alcohol (such as methanol) and a reaction promoter is reacted in a fifth step. Usually, these additional ingredients are added to the fourth intermediate composition to form a fifth composition. Methyl Soyate may also be added after the completion of this step. In a refinement of this variation, at least a portion of the additional epoxide, alcohol, and reaction promoter form a separate compound from the compounds formed thus far from the fatty acid glyceride-containing composition.

In a further variation of the method of the invention, a method for forming bio gasoline is provided. In this variation, the fourth intermediate composition described is blended with gasoline as set forth below. In a refinement, this blend comprises from about 10 to about 30 weight percent of the bio-organic composition and from about 70 to about 90 weight percent gasoline. In another refinement, this blend comprises about 20 weight percent of the bio-organic composition and about 80 weight percent gasoline.

In a variation of the invention, the bio-organic compositions of the present embodiment includes a vegetable oil. Examples of suitable vegetable oils include, but are not limited to, canola oil, coconut oil, corn oil, cotton seed oil, olive oil, grape seed oil, sunflower oil, palm oil, peanut oil, alfalfa oil, safflower oil, soybean oil, and combinations thereof. Soybean oil, alfalfa oil, palm oil, sunflower oil, and combinations thereof are particularly useful in the formulations of the present invention.

In a variation of the present embodiment, the first epoxide or glycol and the second epoxide are each individually selected from the group consisting of epoxides having from 2 to 10 carbon atoms and combinations thereof. In another variation of the present embodiment, the first epoxide and the second epoxide are each individually selected from the group consisting of epoxides having from 2 to 8 carbon atoms. When a glycol is used, the glycol has from 2 to 8 carbon atoms. In a particularly useful variation, the first epoxide or glycol and the second epoxide are different and selected from ethylene oxide and propylene oxide. Typically, the first epoxide is ethylene oxide and the second epoxide is propylene oxide. When utilized, the glycol is typically ethylene glycol.

Advantageously, the bio-organic formulation is formulated to have a viscosity suitable for bio-diesel applications or motor oil applications. To this end, the bio-organic formulation has a viscosity at 25° C., in order of preference, less than or equal to 90 centipoise, 50 centipoise, 40 centipoise, 30 centipoise, 20 centipoise, 19 centipoise, 18 centipoise, 17 centipoise, and 16 centipoise. The bio-organic compositions are also characterized by having a viscosity at 25° C., in order of preference, greater than or equal to 5 centipoise, 7 centipoise, 10 centipoise, 11 centipoise, 12 centipoise, 13 centipoise, 14 centipoise, 15 centipoise, and 16 centipoise. Bio-organic compositions having a viscosity at 25° C. from about 15 to 20 centipoise are particularly useful for bio-diesel applications.

In a variation of the present embodiment, the bio-organic composition further includes a diesel fuel composition that is different than the bio-organic composition without this added diesel fuel composition. In a refinement, the added diesel fuel is present in an amount from about 1 weight % to about 99 weight %. In a further refinement, the added diesel fuel is present in an amount from about 5 weight % to about 50 weight %. In still another refinement, the added diesel fuel composition is present in an amount that is greater than or equal to, in increasing order of preference, 1 weight %, 5 weight %, 10 weight %, 15 weight %, 20 weight %, 90 weight %, 80 weight %, 70 weight %, 60 weight %, 50 weight %, 40 weight %, 30 weight %, and 25 weight %. In still another refinement, the added diesel fuel composition is present in an amount that is less than or equal to, in increasing order of preference, 5 weight %, 10 weight %, 15 weight %, 20 weight %, 25 weight %, 99 weight %, 90 weight %, 80 weight %, 70 weight %, 60 weight %, 50 weight %, 40 weight %, and 30 weight %. In a particularly useful variation, the added diesel fuel is present in an amount from about 10 weight percent to about 30 weight percent. Suitable examples of the additional diesel fuel include a diesel fuel set forth in ASTM D975-07a, the entire disclosure of which is hereby incorporated by reference. Such fuels include Grade No. 1-D S15 which is a light middle distillate fuel for use in diesel engine applications requiring a fuel with a maximum 15 ppm sulfur, Grade No. 1-D S500 which is a light middle distillate fuel for use in diesel engine applications requiring a fuel with a maximum of 500 ppm sulfur; Grade No. 1-D S5000 which is a light middle distillate fuel for use in diesel engine applications requiring a fuel with a maximum of 5000 ppm sulfur; Grade No. 2-D S15 which is a middle distillate fuel for use in diesel engine applications requiring a fuel with maximum of 15 ppm sulfur; Grade No. 2-D S500 which is a middle distillate fuel for use in diesel engine applications requiring a fuel with maximum 500 ppm sulfur; Grade No. 2-D S5000 which is middle distillate fuel for use in diesel engine applications requiring a fuel with maximum 5000 ppm sulfur; and a combination thereof.

In another variation of the present embodiment, the bio-organic composition further includes a gasoline composition (e.g., gasoline). In a refinement, the added gasoline is present in an amount from about 1 weight % to about 99 weight %. In a further refinement, the added gasoline is present in an amount from about 5 weight % to about 50 weight %. In still another refinement, the added gasoline composition is present in an amount that is greater than or equal to, in increasing order of preference, 1 weight %, 5 weight %, 10 weight %, 15 weight %, 20 weight %, 90 weight %, 80 weight %, 70 weight %, 60 weight %, 50 weight %, 40 weight %, 30 weight %, and 25 weight %. In still another refinement, the added gasoline composition is present in an amount that is less than or equal to, in increasing order of preference, 5 weight %, 10 weight %, 15 weight %, 20 weight %, 25 weight %, 99 weight %, 90 weight %, 80 weight %, 70 weight %, 60 weight %, 50 weight %, 40 weight %, and 30 weight %.

In still another variation of the present invention, the variations and refinements set forth above further include a fuel additive. Examples of useful fuel additives include alcohols (e.g., ethanol, methanol), benzene, iso-octane and the like. In one refinement, the fuel additive is an alcohol, such as ethanol and methanol, present in an amount less than or equal to about 30 weight percent. In another refinement, the fuel additive is an alcohol, such as ethanol or methanol, present in an amount less than or equal to about 25 weight percent. In another refinement, the fuel additive is an alcohol, such as ethanol or methanol, present in an amount greater than or equal to about 1 weight percent. In still another refinement, the fuel additive is an alcohol, such as ethanol or methanol, present in an amount greater than or equal to about 5 weight percent. In still another refinement, the fuel additive is an alcohol such as ethanol or methanol, present in an amount greater than or equal to about 10 weight percent. In yet another refinement, the fuel additive is an alcohol, such as ethanol or methanol, present in an amount less than or equal to about 15 weight percent.

In another embodiment of the present invention, an internal combustion engine system utilizing the bio-diesel fuel compositions, bio-organic compositions, and blends set forth above is provided. With reference to FIG. 1, a schematic illustration of the internal combustion engine system is provided. Internal combustion engine system 10 includes fuel supply system 12 and internal combustion engine 14. Fuel supply system 12 includes fuel tank 16 which holds bio-diesel fuel 18 and fuel line 20. Bio-diesel fuel 18 is supplied to engine 14 via fuel line 20. Bio-diesel fuel 18 is combusted in engine 14 providing useful work as known to those skilled in the art of automotive engine design.

The following examples illustrate the various embodiments of the present invention. Those skilled in the art will recognize many variations that are within the spirit of the present invention and scope of the claims.

Example 1

A bio-organic composition is formed by mixing about 59 parts soybean oil with about 3 parts potassium hydroxide in a closed/pressured mixing vessel to form a first intermediate composition. The first intermediate composition is heated to a temperature from 270° F. to 280° F. at a pressure greater than 1.1 atm. While the temperature is maintained within this range, about 7 parts by weight ethylene oxide is added to form a second intermediate reaction mixture. A third intermediate mixture is formed from about 56 parts of the second intermediate reaction mixture, 13 parts water, and 3 parts potassium hydroxide. The temperature of the third reaction mixture is maintained at a temperature of about 270° F. to 280° F. for an additional hour. While maintaining the temperature, about 21 parts propylene oxide are added. The water is then removed under a vacuum of about 26 inches of mercury to a final product having a water content less than about 0.5 weight percent water. This composition is useful as a motor oil substitute.

Example 2

A bio-organic composition is formed by mixing about 59 parts soybean oil with about 3 parts potassium hydroxide in a closed/pressure blending vessel (at a pressure greater than 1.1 atm) to form a first intermediate composition. The first intermediate composition is heated to a temperature from 270° F. to 280° F. While maintaining the temperature within this range, about 7 parts by weight ethylene oxide is added to form a second intermediate reaction mixture. A third intermediate mixture is formed from about 56 parts of the second intermediate reaction mixture, 13 parts water, and 3 parts potassium hydroxide. The third reaction mixture is maintained at a temperature from about 270° F. to 280° F. for an additional hour. About 15 parts propylene oxide are added while maintaining the temperature and pressure to form a fourth intermediate mixture. Additional epoxides (4 to 10 parts by weight) and about 8 parts methanol in the presence of a reaction promoter are reacted to form a fifth intermediate mixture. The water is then removed under a vacuum of about 26 inches of mercury to a final product having a water content less than about 0.5 weight percent water. This composition is useful with modifications (including the optional addition of methyl soyate) as a bio-diesel fuel.

Example 3

A bio-organic composition is formed by mixing about 59 parts soybean oil with about 3 parts potassium hydroxide in a closed/pressured blending vessel (at a pressure greater than 1.1 atm) to form a first intermediate composition. The first intermediate composition is heated to a temperature from about 270° F. to about 280° F. While maintaining the temperature within this range, about 7 parts by weight ethylene oxide is added to form a second intermediate reaction mixture. A third intermediate mixture is formed from about 56 parts of the second intermediate reaction mixture, 13 parts water and about 3 parts potassium hydroxide. The third reaction mixture is maintained at a temperature from about 270° F. to about 280° for an additional hour. About 15 parts propylene oxide are added while maintaining the temperature and pressure. The water is then removed under a vacuum of about 26 inches of mercury to a final product having a water content less than about 0.5 weight percent water. This composition may be blended with gasoline as set forth below. In one instance, the blend includes from about 10 to about 30 weight percent of the bio-organic composition and from about 70 to 90 weight percent gasoline. In another instance, the blend includes about 20 weight percent of the bio-organic composition and about 80 weight percent gasoline. This composition is useful as a bio-gasoline.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of forming a bio-organic composition, the method comprising:
   a) mixing a fatty acid glyceride-containing composition and a first reaction promoter at a first predetermined temperature to form a first intermediate reaction mixture, the first predetermined temperature being from 200° F. to 350° F.;
   b) adding a first epoxide or glycol to the first intermediate reaction mixture to form a second intermediate reaction mixture;
   c) combining at least a portion of the second intermediate reaction mixture with water and additional reaction promoter to form a third intermediate reaction mixture, the water partially hydrolyzing fatty acid glycerides in the fatty acid glyceride-containing composition such that the bio-organic composition includes less than 5 weight percent free glycerol;
   d) adding a second epoxide to the third intermediate reaction mixture to form a fourth intermediate reaction mixture; and
   e) removing the water under a vacuum such that the bio-organic composition is recovered, the bio-organic composition including glycerol esterified with one or two acid groups and free glycerol in an amount that is less than 5 weight percent.

2. The method of claim 1 wherein the water partially hydrolyzes fatty acid glycerides in the fatty acid glyceride-containing composition such that the bio-organic composition includes less than 0.1 weight percent free glycerol.

3. The method of claim 1 wherein the fatty acid glyceride-containing composition comprises vegetable oil.

4. The method of claim 3 wherein the vegetable oil is selected from the group consisting of canola oil, coconut oil, corn oil, cotton seed oil, olive oil, grape seed oil, sunflower oil, palm oil, peanut oil, alfalfa oil, safflower oil, soybean oil, and combinations thereof.

5. The method of claim 1 wherein the fatty acid glyceride-containing composition comprises animal fat.

6. The method of claim 1 wherein the bio-organic composition includes water in an amount less than about 0.5 weight percent.

7. The method of claim 1 further comprising forming a fifth composition by adding one or more additional components to the fourth intermediate reaction mixture, the one or more addition components selected from the group consisting of additional epoxide, an alcohol, a reaction promoter and an ester.

8. The method of claim 7 wherein the ester is methyl soyate.

9. The method of claim 1 wherein the first epoxide and the second epoxide are each individually selected from the group consisting of epoxides having from 2 to 10 carbon atoms and combinations thereof.

10. The method of claim 1 wherein the first epoxide is ethylene oxide and the second epoxide is propylene oxide.

11. The method of claim 1 wherein the bio-organic composition has a viscosity less than or equal to about 30 centipoise at 25° C.

12. The method of claim 1 wherein the bio-organic composition has a pour point less than or equal to about 0° F.

13. A bio-organic composition comprising:
   residues of a fatty acid glyceride-containing composition, the fatty acid glyceride-containing composition having a first viscosity and a first pour point, the residues of the fatty acid glyceride-containing composition including glycerol being esterified with one or two acid groups from an initial fatty acid glyceride-containing composition;
   residues of a first epoxide present in a first epoxide concentration or residues of a first glycol present in a first glycol concentration;
   residues of a second epoxide present in a second epoxide concentration, wherein the first epoxide is the same or different than the second epoxide;
   glycerol esterified with one or two acid groups; and
   free glycerol in an amount that is less than 5 weight percent wherein the bio-organic composition has a viscosity lower that the first viscosity and/or a pour point lower than the first pour point.

14. The bio-organic composition of claim 13 wherein the free glycerol in an amount that is less than 0.1 weight present.

15. The bio-organic composition of claim 13 wherein the first epoxide and the second epoxide are each individually selected from the group consisting of epoxides having from 2 to 10 carbon atoms and combinations thereof.

16. The bio-organic composition of claim 13 wherein the first epoxide and the second epoxide are each individually selected from the group consisting of epoxides having from 2 to 8 carbon atoms.

17. The bio-organic composition of claim 13 wherein the first epoxide is ethylene oxide and the second epoxide is propylene oxide.

* * * * *